US005524192A

United States Patent [19]
Dauerer et al.

[11] Patent Number: 5,524,192
[45] Date of Patent: Jun. 4, 1996

[54] SIMPLIFYING MAINTAINING AND DISPLAYING OF PROGRAM COMMENTS

[75] Inventors: Norman J. Dauerer, Hopewell Junction; Edward E. Kelley, Wappingers Falls, both of N.Y.

[73] Assignee: International Business Machines Corporation, Armonk, N.Y.

[21] Appl. No.: 15,501

[22] Filed: Feb. 9, 1993

[51] Int. Cl.$^6$ ..................................................... G06T 1/00
[52] U.S. Cl. ........................... 395/148; 395/922; 395/144
[58] Field of Search ................................. 395/144, 145, 395/146, 148, 922; 364/191

[56] References Cited

U.S. PATENT DOCUMENTS

| 4,370,707 | 1/1983 | Phillips et al. | 364/200 |
| 4,398,249 | 8/1983 | Pardo et al. | 364/300 |
| 4,488,258 | 12/1984 | Struger et al. | 364/900 |
| 4,710,885 | 12/1987 | Litteken | 395/148 |
| 4,727,502 | 2/1988 | Katsura et al. | 364/706 |
| 4,860,203 | 8/1989 | Corrigan et al. | 364/300 |
| 5,008,810 | 6/1991 | Kessel et al. | 364/191 |
| 5,287,538 | 2/1994 | Kawakami et al. | 395/144 |

FOREIGN PATENT DOCUMENTS

| 61-211738 | 9/1986 | Japan . |
| 63-259724 | 10/1988 | Japan . |
| 63-253432 | 10/1988 | Japan . |
| 64-26906 | 1/1989 | Japan . |
| 64-50107 | 2/1989 | Japan . |
| 25101 | 1/1990 | Japan . |

OTHER PUBLICATIONS

"Program Generators", which Computer (Oct. 1983), pp. 131, 133, and 135.
Partilo et al., "Parse—Tree Annotations", Communications of the ACM, vol. 32 No. 12 (Dec. 1989), pp. 1467–1477.
Heerjee et al., "Rapid Implementation of SQL: A Case Study Using YACC and LEX", Information and Technology, vol. 30 No. 4, (May 1988), pp. 228–236.

Primary Examiner—Heather R. Herndon
Assistant Examiner—Joseph H. Feild
Attorney, Agent, or Firm—Graham S. Jones, II

[57] ABSTRACT

A data processing system has display means with a display screen requiring a screen display instruction with each line of textual comments in a file to be displayed on the screen and means for associating comments to be presented on the display screen of a data processing machine with programming data in a sequential format, with means for designating the comments by a label placed before the commencement of the comments. Means are provided for interpreting the label to insert print display command indicia associated with the textual comments for printing the comments upon the display screen. The label is interpreted by means of an external program.

9 Claims, 2 Drawing Sheets

SIMPLIFYING MAINTAINING AND DISPLAYING OF PROGRAM COMMENTS

BACKGROUND OF THE INVENTION

1. Field of the Invention

This invention relates to computer systems and more particularly to the organization of data in computer systems.

2. Description of Related Art

The creation and maintenance of program comments that are are embedded in a computer program and are meant to be viewed on the screen by an invocation of the program is a process which is complicated. When programs are written they usually contain comments to explain how to use the program. The comments are usually invoked by a user who enters the program name followed by an argument that refers to a particular set of comments to be displayed.

The program then calls a routine that contains a series of instructions that are displayed to the monitor viewer as text on the screen in response to a "display command" preceding each comment. Such a "display command" tells the computer to display the text (referred to herein interchangeably as "comments") which follows upon the screen. In addition to the "display command", in accordance with the language syntax, where the REXX language is employed, each comment is preceded and followed by a quote.

Editing of comments in a program is difficult because of the punctuation (quotes) required to distinguish comments from commands. The problem is that a program may contain a long list of text to be displayed, which text must be changed occasionally. Because of the need to type the "display command" and the quotes before and after each line of text, it becomes difficult to edit the text. For example the split/join commands (which respectively split a line into two lines or join two consecutive lines) found on most editors leave the "display command" instruction and quotes misplaced in the file.

An object of this invention is simplification of entering and changing the comments that are placed in a program that are used to explain how to use that program in a way that permits editing and updating the comments more simply and faster.

A further object of this invention is to eliminate the need for the "display command" instruction before each comment and to eliminate the need to imbed each comment with quotes, i.e. quotes before and after the text to be displayed to facilitate entry of data and changing of the data entered previously.

Still another object of this invention is to simplify creation of programs and maintenance of program comments that are are imbedded in a computer program, which comments are meant to be viewed on the screen by each invocation of the program.

In accordance with this invention by means of a signal which is not typed at the beginning and the end of each line, the system is told what lines are comments and what lines are not.

Further in accordance with this invention, An a data processing system having display means with a display screen requiring a screen display instruction with each line of textual comments in a file to be displayed on the screen and means for associating comments to be presented on the display screen of a data processing machine with programming data in a sequential format, with means for designating the comments by a label placed before the commencement of the comments, the improvement comprising means for interpreting the label to insert print display command indicia associated with the textual comments for printing the comments upon the display screen. Preferably, the label is interpreted by means of an external program.

Still further in accordance with this invention, the system performs the steps as follows:

a) start,
b) test whether the comment has been read,
   i) if yes, run the program and then end,
   ii) if no, call the read program,
c) capture read arguments,
d) find locations,
e) read program section,
f) format comments
g) display comments, and
h) end.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

The invention eliminates the need for a program "display command" which conventionally must precede each textual comment in a file. For example: in REXX (a computer language known as the REXX language) each comment, that is printed on the screen by the program, must be preceded by the "SAY" display command (which causes the display to print the words within quotes upon the screen as comments to the viewer of the display. Every line of such text to be displayed must first be preceded by the SAY command at the beginning of the line, followed by a quote, then the line of text to be displayed followed in turn by a quote at the end of that line of text to be displayed. Frequently a program includes several screens of text. When a programmer has to write or to change the comments, it becomes very awkward and time consuming to split/join and reflow the text because the SAY commands and the quotes must be in the proper places.

The invention, by eliminating the need for the SAY command and the quotes, makes writing and changing the text comments as easy as free form typing, yet because of the new way of inserting the SAY commands later into the system the operation of displaying the textual comments on the screen is performed in the identical manner.

Figure 1:
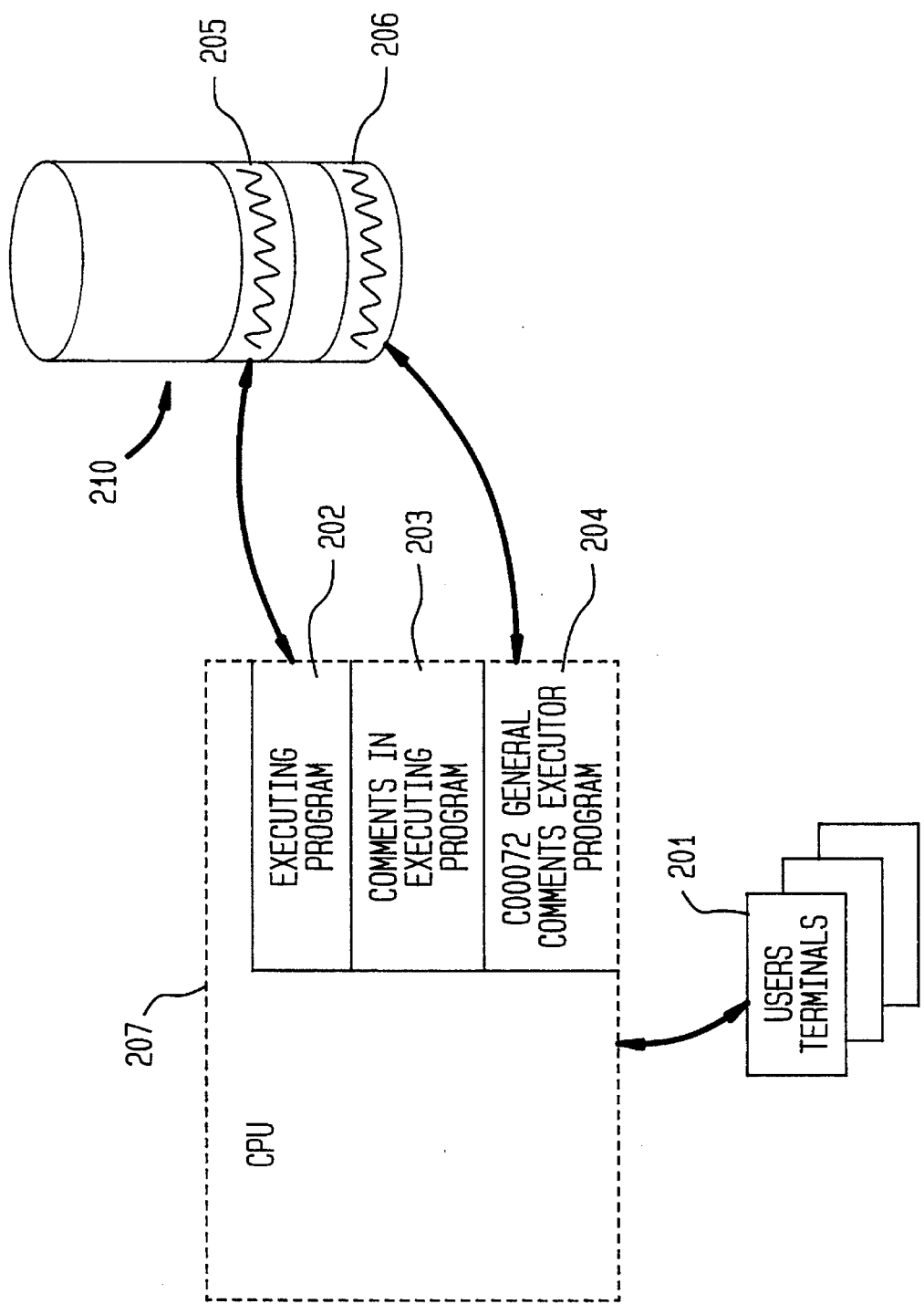
FIG. 1 shows a block diagram of a data processing system in accordance with this invention.

Referring to FIG. 1, user terminals 201 are coupled to a central processing unit (CPU) 207 which is coupled to a central storage unit 210. An executing program is stored in a storage area 205 in a storage unit 210. The comments to the executing program are stored in storage area 205 attached to the executing program. The general comments executor program is stored in storage area 206 of storage unit 210.

Users at terminals 201 initiate requests to the CPU 207 to load and run the executing program from central storage unit 210 into memory unit 202 An CPU 207. The CPU 207 issues an instruction to retrieve the executing program from the central storage area 205 in central storage unit 210 and to load the executing program into memory area 202 in CPU 207.

The comments to the executing program are loaded into memory 203 attached to the portion of memory 202 employed for the executing program.

When a user requests the executing program in memory 202 to issue comments to explain its operation, the executing program issues a request to the CPU 207 to load into memory 204 the external program referred to herein as C00072 general comments executing program (together with the attached comments) from storage location 206 in central storage unit 210. Then the C00072 program in memory 204 accesses the comments in memory 203 and processes them. The C00072 program includes the steps shown in operations 105 to 109 in FIG. 2.

Figure 2:
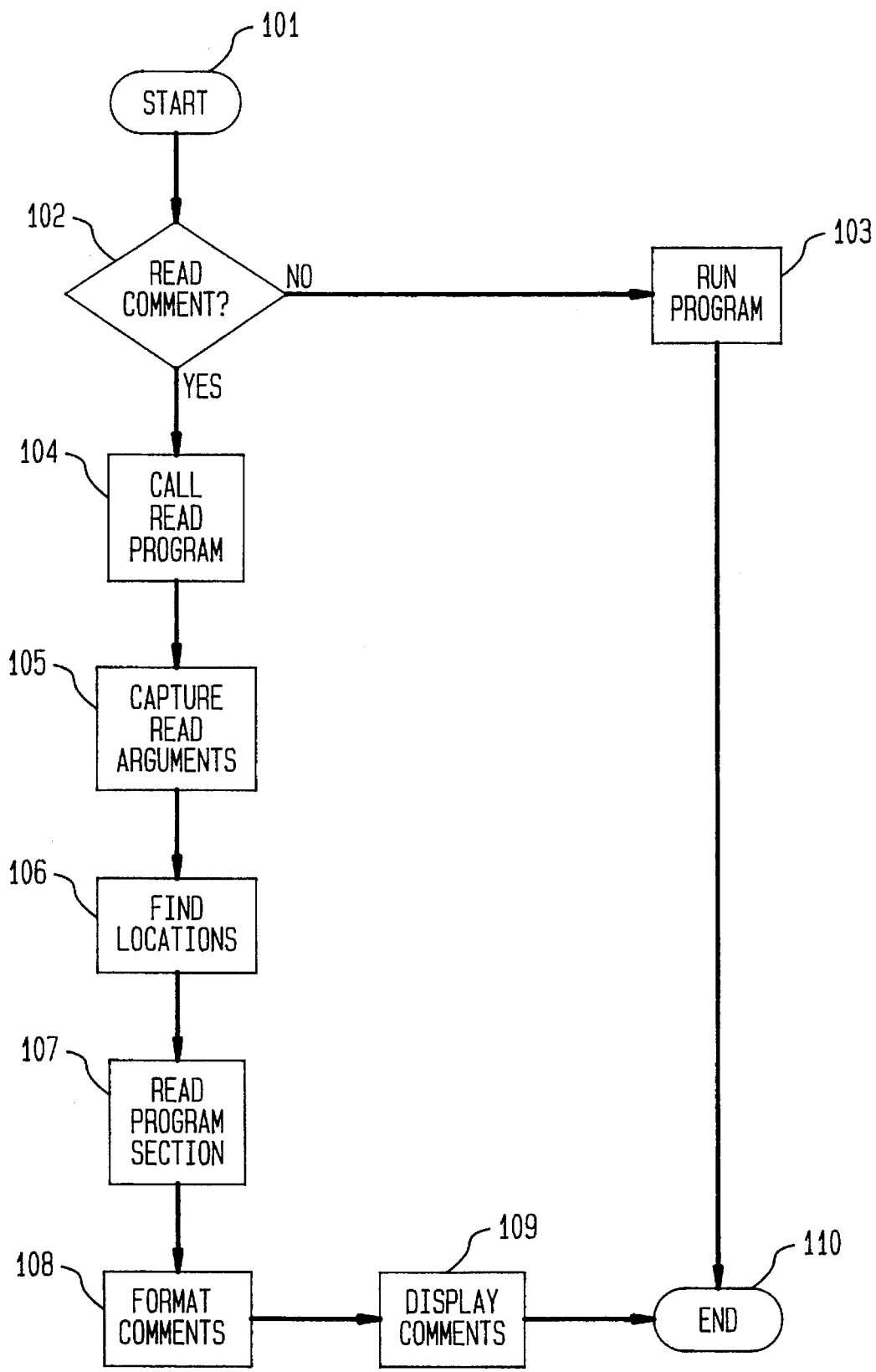
FIG. 2 shows a flow chart for operating the system of this invention.

Referring to the flowchart in FIG. 2 the system operates as follows:

Flowchart

OPERATION 101 Start the executing program.

OPERATION 102 Is a read comment function being issued? (That is, has a request been made to display the program comments.) If YES, go to Operation 104. If NO, go to Operation 103.

OPERATION 103 Run program. This means that the executing program can run normally.

OPERATION 104 Call the read program, i.e. call for parsing the source, as described below. Upon receipt of the program comment indicator, the executing program issues a command to get its file name, file type and file mode. Next the C00072 general comments executor program is called and it receives parameters indicating the label name of the subroutine containing the comments and the file name, file type and file mode of the calling executing program.

OPERATION 105 In the process of capturing the read arguments, i.e. parameters, such as the start label and the name of the calling program, the C00072 general comments executor program receives or captures the read parameters including the start labels, and the name of the calling program. Many sets of comments may be requested. These are indicated by the start labels. The user requests the comments by issuing the program name followed by an argument that identifies the set of comments desired.

OPERATION 106 Find the line location of the start and the end of the selected comments in the program file by using the start labels supplied by the calling program. The C00072 general comments executor program searches the calling executing program for the beginning position and the ending position of the program comments. The comments are written in a non-executable fashion in the calling executing program without the necessary print command preceding each statement and the quote at the beginning and end of each statement.

OPERATION 107 Read the section of the program file between the start and end of the selected comments to capture the comments. The C00072 general comments executor program then reads the calling program statements in the calling executing program from the position immediately following the comments label (TELL in this case) to the position immediately preceding the comments sub-routine end statement. (Return in this case.) The statements are the program comments of the calling executing program. After being read by the C00072 general comments executor program, the comments are stored in a textual comments table in the C00072 program.

OPERATION 108 Then to display the comments, the C00072 program then loops through the textual comments table and places the print command (e.g. SAY) before each line of the textual comments as a table entry together with a quote at the beginning and end of each comment. That is, the C00072 formats each comment with the appropriate command so that the system for writing to the screen will see the identical type of REXX data as before.

OPERATION 109 Then to display the comment statements, they are executed by the C00072 general comments executor program which displays them on the screen. At this point the C00072 program ends. The comments are thus displayed on the screen as before.

OPERATION 110 End the executing program.

In this discussion a program which executes a function is called the executing program. Executing programs usually include an additional function which produces textual comments that are instructions as to how to run the program, which need to be displayed on the terminal to guide the operator of the system. Access to the comments is provided by executing the program with a parameter indicating that a request for comments has been issued. This means that the program does not run its regular execution routine but instead prints its comments.

Upon receipt of the program comment indicator, the executing program issues a command to get its file name, file type and file mode. Next the C00072 general comments executor program is called and is passed parameters indicating the label name of the subroutine containing the comments and the file name, file type and file mode of the calling executing program.

The C00072 general comments executor program searches the calling executing program for the beginning position and the ending position of the program comments. The comments are written in a non-executable fashion in the calling executing program without the necessary preceding print command for each statement or the quote at the beginning and end of each statement.

The C00072 general comments executor program then reads the calling executing program statements in the calling executing program from the position immediately following the comments label to the position immediately preceding the comments subroutine end statement. The statements are the program comments of the calling executing program. After being read by the C00072 general comments executor program, the comments are stored in a comments table in the C00072 program.

The C00072 program then loops through the comments table and places the print command before each comments table entry together with a quote at the beginning and end of each comment. The comment statements are then executed by the system, which displays them on the screen.

After displaying the comments, control is returned to the calling executing program at which point the calling program generally ends execution.

This invention simplifies entering and changing the comments that are placed in a program that are used to explain how to use the program.

This invention eliminates the need to place a "display command" before each comment and to imbed each comment with quotes at the beginning and end of each line of text. The purpose is make editing and updating the comments simpler and faster. The invention is a program that is executed by the program with the imbedded comments whenever the subroutine used to contain the comments is called. The invention locates and reads the part of the program file with the comments and displays them.

The invention receives from the calling program the file name and file type of the calling program and the name of the label of the subroutine that contains the comments. The invention finds the position of the comments in the calling program, and then reads and displays them.

Table I below illustrates an example of a standard way of including comments that describe a program. The program being described here will be name EXECUTING EXEC A1. The lines of the Table I provide the functions as follows:

Line 01 indicates that the program is a REXX program.

Line 02 says to receive the input parameter.

Line 03 asks if the input parameter is a question mark.

Lines 04 to 07 will be invoked if the input parameter is a question mark.

Line 05 calls the subroutine that contains the textual comments and will display the textual comments. In this case, lines 13 through 31 comprise the subroutine containing the textual comments with the SAY instructions to display what follows the SAY command followed in turn by the textual comments on each of those lines. After the comments are displayed, line 06 will exit the program with a return code of 100.

Line 07 ends the "do" statement for the comments.

Line 08 will call the "process" subroutine that would contain the main program processing. In this example the "process" subroutine will be invoked if the comments are not displayed. If the main process subroutine is called then the process statements will be placed after line 10.

Line 09 exits the program.

TABLE I

```
01 /**/
02 PARSE ARG    XX
03 IF XX = '?'
04    THEN DO
05       CALL TELL
06       EXIT 100
07    END
08 CALL PROCESS
09 EXIT
10 PROCESS:   /* THE PROGRAM PROCESSING INSTRUCTIONS BEGIN HERE. */
11 RETURN     /* THE PROGRAM PROCESSING INSTRUCTION END HERE. */
12 TELL:
13 SAY'Since this is a search of userids on the callup directory, errors may'
14 SAY'be produced because of errors on the directory. Or if a person has'
15 SAY'userids on another directory then his principal userid and node will be'
16 SAY'from the last directory that this program is run against.'
17 SAY'The following files will be produced:'
18 SAY'ILCMAST BLANKID -    A list of userids on the ILCMAST OFSMLIST file whose'
19 SAY'                     employee serial numbers are blank. No search can be'
20 SAY'                     made in the CALLUP directory.'
21 SAY'ILCMAST MATCH -      Only the matches on the serial search of the CALLUP'
22 SAY'                     directory.'
23 SAY'ILCMAST MISEMPS -    Only the mismatches on the serial search of the'
24 SAY'                     CALLUP directory for employee serial numbers.'
25 SAY'ILCMAST MISMGRS -    Only the mismatches on the serial search of the'
26 SAY'                     CALLUP directory for manager serial numbers.'
27 SAY'ILCMAST NEWDEPT -    List of all userids whose depts have changed.'
28 SAY'ILCMAST PROCESS -    List of all userids used in the directory compare.'
29 SAY'ILCMAST REMOVED -    List of all userids not used in the directory compare.'
30 SAY'                     Employees who are on a different directory than the'
31 SAY'                     requested directory.'
32 RETURN
```

Table II below shows an example of the technique of this invention of including comments that describe a program separate from the commands and quotes. Again the program will be known as the EXECUTING EXEC A1 for the sake of the example. The functions performed by the lines in Table II are as follows:

Line 01 indicates that the program is a REXX program with the virgule, asterisk, asterisk, virgule code which signifies the REXX language.

Line 02 says to receive the input parameter.

Line 03 asks if the input parameter is a question mark.

Line 04 to line 08 will be invoked if the input parameter is a question mark. If the input parameter is a question mark, then line 05 uses the REXX command PARSE which breaks data into pieces and the REXX command SOURCE which returns to the variable source the identity of the program being executed, which will again be known as the EXECUTING EXEC A1, and place the file name EXECUTING in the variable fn11, the file type EXEC in the variable ft22 and the file mode A1 in the variable fm22.

Line 06 will call program C00072 and pass the parameters TELL, the file name, file type and file mode. TELL is the label name where the comments begin. The label name indicating the beginning position of the comments may have any name.

Line 13 is the line number of the TELL label and lines 14 to 32 are the actual comments.

Program C00072 will search the calling program indicated by the file name (fn), file type (ft) and file mode (fm) for the beginning comments indicator which is TELL.

Program C00072 will also read all of the textual comments, place the "SAY" instruction at the beginning of each textual comment and place quotes at the beginning and end of each line of text for immediate display upon the system display unit.

Line 07 will exit the program with a return code of 100.

Line 08 ends the "do" statement for the comments.

Line 09 will call the "process" subroutine that would contain the main program processing. In this example the "process" subroutine wall be invoked if the comments are not displayed. If the main process subroutine is called then the process statements will be placed after line 11.

Line 10 exits the program.

TABLE II

```
01 /**/
02 PARSE ARG XX .
03 IF XX = ?
04    THEN DO
05       PARSE SOURCE . . FN11 FT22 FM22 .
06       'EXEC C00072' TELL FN11 FT22 FM22
07       EXIT 100
08    END
09 CALL PROCESS
10 EXIT
11 PROCESS:    /* THE PROGRAM INSTRUCTIONS BEGIN HERE. */
12 RETURN      /* THE PROGRAM INSTRUCTIONS END HERE. */
13 TELL:
14 Since this is a search of userids on the callup directory, errors may
15 be produced because of errors on the directory. Or if a person has
16 userids on another directory then his principal userid and node will be
17 from the last directory that this program is run against.
18 The following files will be produced:
19 ILCMAST BLANKID -       A list of userids on the ILCMAST OFSMLIST file whose
20                         employee serial numbers are blank. No search can be
21                         made in the CALLUP directory.
22 ILCMAST MATCH -         Only the matches on the serial search of the CALLUP
23                         directory.
24 ILCMAST MISEMPS -       Only the mismatches on the serial search of the
25                         CALLUP directory for employee serial numbers.
26 ILCMAST MISMGRS -       Only the mismatches on the serial search of the
27                         CALLUP directory for manager serial numbers.
28 ILCMAST NEWDEPT -       List of all userids whose depts have changed.
29 ILCMAST PROCESS -       List of all userids used in the directory compare.
30 ILCMAST REMOVED -       List of all userids not used in the directory compare.
31                         Employees who are on a different directory than the
32                         requested directory.
33 RETURN
```

Although the above implementation is in the REXX language (a computer language known as the REXX language) it is well within the ability of those skilled in the art to use it in many languages.

While this invention has been described in terms of the above embodiment(s), those skilled in the art will recognize that the invention can be practiced with modifications within the spirit and scope of the appended claims.

Having thus described the invention, what is claimed as new and desirable and desired to be secured by letters patent is as follows:

1. A data processing system including a data processing machine including a central processing unit which is coupled to a central storage unit and at least one terminal with a display screen connected to said central processing unit, an executing program being stored in a first storage area in said storage unit, comments to said executing program being stored in said first storage area following a start label, a general comments executor program being stored in a second storage area in said storage unit, said terminal being adapted for initiating requests to said central processing unit to load and run said executing program from said first storage area In said storage unit into a first memory unit in said central processing unit, said central processing unit being adapted to issue an instruction to retrieve said executing program from said first storage area and to load said executing program into said first memory unit, said comments to said executing program being loaded Into a second memory unit in said central processing unit attached to the portion of said first memory unit employed for said executing program, said central processing unit including a general purpose procedural language program which includes a display command which conventionally must precede each textual comment in a program, which is to be displayed on a screen, said general purpose procedural language program being adapted to call a routine that contains a series of comments that can be displayed as text on the screen in response to a display command preceding each of said comment, said display command being required to tell said machine to display said text which follows said display command upon said screen, means for associating a selected comment having a line location, a start, and an end in a program file with a print command, said comment to be presented on said display screen of said terminal of said data processing machine with programming data in a sequential format, means for finding in a said program file the line location of the start and the end of the selected comments in said program file by using start labels supplied by said calling program means, means for reading the section of said program file between the start and the end of said selected comments in said program file and means for storing said comments as textual comments in a textual comments table, means for inserting print display command indicia before each line of said textual comments in said table to enable printing of each of said textual comments upon said display screen, and means for displaying said textual comments on said screen, whereby said system permits a user to write data into said system without entering print display command indicia for each line.

2. The system of claim 1 wherein said means for finding the location of the selected comments comprises a program means.

3. The system of claim 1 including as follows:

a) means for starting operation of said general comments executor program means, b) said general comments executor program means including means for testing whether a request has been made to display program comments, i) if yes, then employing said general comments execution program means for operating a sequence of steps including calling a read program means, operating running program means for capturing read arguments, running a find locations program means, running a read program means section, operating a format comments section running a format comments program means, running a display comments program means and then ending, ii) if no, then run executing program means and then providing an output initiating operation of a means for actuation of a means for ending operation of said executing program means, c) means for receiving a read argument from said means for capturing read arguments and providing said arguments to said find locations program means, d) said find locations program means including means for finding a line location of the start and the end of said selected comment in a program file and providing said line location of the start and end of said selected comment to said read program means, e) said read program means section including means for reading a section of the program file between said start and said end of said selected comment to receive said comment, f) said format comments section including means for formatting said selected comment comprising placing a print command before each line of said comment, g) means for displaying a selected comment on said screen, and h) said means for displaying providing an output initiating operation of said means for actuation of said means for ending operation of said executing program means.

4. The system of claim 3 wherein said means for receiving read arguments operates with parameters including one of said start labels and a name of said executing program means.

5. The system of claim 1 wherein said executing program means includes, a) means for testing whether a comment has been read, i) if no, then operating said executing program means and then said executing program ends, ii) if yes, then operate means for running a call read program means, b) call said general comments executing program, c) means for receiving read arguments, d) means for employing said read arguments to find the location of a comment, e) means for reading a program section, f) means for formatting a selected comment comprising placing a print command before each line of said comment, and g) means for displaying a selected comment on said screen.

6. A data processing system including:

a data processing machine including a central processing unit which is coupled to a central storage unit and at least one terminal with a display screen connected to said central processing unit, an executing program means being stored in a first storage area in said storage unit, comments to said executing program means being stored in said first storage area, a general comments executor program means being stored in a second storage area in said storage unit, said terminal being adapted for initiating requests to said central processing unit to load and run said executing program means from said first storage area in said storage unit into a first memory unit in said central processing unit, said central processing unit being adapted to issue an instruction to retrieve said executing program means from said first storage area and to load said executing program means into said first memory unit, said comments to said executing program means being loaded into a second memory unit in said central processing unit attached to the portion of said first memory unit employed for said executing program means, said central processing unit including a general purpose procedural language program means which includes a display command which conventionally must precede each textual comment in a file, said general purpose procedural language program being adapted to call a routine that contains a series of comments that can be displayed as text on the screen in response to a display command preceding each of said comment, said display command being required to tell said machine to display said text which follows said display command upon said screen, means for associating a selected comment having a line location, a start, and an end in a program file with a print command, said comment to be presented on said display screen of said terminal of said data processing machine with programming data in a sequential format, with means for designating said comment by a label placed before the commencement of said comment, said system including means for starting operation of said executing program means, means for testing whether a request has been made to display program comments, i) if yes, then employing said general comments execution program means for calling a read program means to obtain the program comment indicator and issue a command to get the file identity, and a general comments executor program means for receiving parameters indicating the label and name of the subroutine containing the comments and the identified file and the identity of the calling executing program means, means for capturing read arguments, means for finding the line location of the start and the end of selected comments in said program file by using start labels supplied by the calling program means, means for reading the section of said program file between the start and the end of the selected comments to capture the comments and storing the textual comments in a textual comments table, means for preparing said comments for display by looping through said textual comments table and placing a print command before each line of said textual comments, and general comments executor program means for displaying said comments on said display screen, ii) if no, means for calling a run executing program means and then providing an output initiating operation of a means for actuation of a means for ending operation of said executing program means, whereby said system permits a user to write data into said system without entering print display command indicia for each line.

7. A method for a data processing system for displaying textual comments in a file to be displayed played on a display screen with a selected comment having a line locations, a start, and an end in a program file, said comment to be presented on the display screen of a data processing machine with programming data in a sequential format, designating said comment by a label placed before the commencement of said comment, the method comprising:

reading said label and said comment from said program file, interpreting said label, inserting print display command indicia before each line of said textual comment to enable printing of said textual comment upon said display screen, said method including the steps as follows:

a) starting operation of a general comments executor program, b) testing whether a read comment function has been issued,
i) if yes, then operating a sequence of steps including operating for running means to call a read program, operating running program capturing read arguments, running a find locations program, running a read program section, operating a format comments section running a format comments program, running a display comments program and then ending, ii) if no, then operating for calling a run program permitting the executing program to run normally and then end, c) calling said general comments executing program and receiving a read argument from said capturing read arguments, d) said find locations program employing said read arguments for finding a line location of the start and the end of said selected comment in a program file, e) said read program section reading a section of the program file between said start and said end of said selected comment to receive said comment, f) said format comments section including formatting said selected comment comprising placing a print command before each line of said comment, g) displaying a selected comment on said screen, and h) displaying providing an output initiating ending operation of said executing program.

8. The method of claim 7 wherein interpreting said label is performed with a program.

9. A method for a data processing system for displaying textual comments in a file to be displayed on a display screen with a selected comment having a line location, a start, and an end in a program file, said comment to be presented on the display screen of a data processing machine with programming data in a sequential format, designating said comment by a label placed before the commencement of said comment, the method comprising:

reading said label and said comment from said program file, interpreting said label, inserting print display command indicia before each line of said textual comment to enable printing of said textual comment upon said display screen, including the steps as follows:

a) testing whether a comment has been read,
i) if no, the comment has been read, operate an executing program and then ending said program,
ii) if yes, then operate a call read program, b) call said general comments program, c) receiving read arguments, d) employing said read arguments for finding the location of a comment, e) reading a program section, f) formatting a selected comment comprising placing a print command before each line of said comment, and g) displaying a selected comment on a screen.

* * * * *